(12) United States Patent
Kim

(10) Patent No.: US 7,324,601 B2
(45) Date of Patent: Jan. 29, 2008

(54) COARSE FREQUENCY SYNCHRONIZATION METHOD AND APPARATUS IN OFDM SYSTEM

(75) Inventor: Kwang-chul Kim, Seoul (KR)

(73) Assignee: Samsung Electronics Co., Ltd., Suwon (KR)

(*) Notice: Subject to any disclaimer, the term of this patent is extended or adjusted under 35 U.S.C. 154(b) by 668 days.

(21) Appl. No.: 10/784,715

(22) Filed: Feb. 24, 2004

(65) Prior Publication Data

US 2004/0179625 A1    Sep. 16, 2004

(30) Foreign Application Priority Data

Mar. 15, 2003 (KR) ............. 10-2003-0016287

(51) Int. Cl.
H04K 1/10  (2006.01)
H04L 27/06  (2006.01)
H04J 11/00  (2006.01)

(52) U.S. Cl. ............ 375/260; 375/343; 370/210
(58) Field of Classification Search ............ 375/145, 375/149, 260, 341, 343; 370/206, 208, 210
See application file for complete search history.

(56) References Cited

U.S. PATENT DOCUMENTS

| | | | |
|---|---|---|---|
| 6,021,165 A * | 2/2000 | Ohkubo et al. | 375/344 |
| 6,148,045 A * | 11/2000 | Taura et al. | 375/344 |
| 6,373,861 B1 * | 4/2002 | Lee | 370/503 |
| 6,628,606 B1 | 9/2003 | Hong et al. | |
| 6,647,066 B1 * | 11/2003 | Szajnowski | 375/260 |

(Continued)

FOREIGN PATENT DOCUMENTS

EP    1220505 A2    7/2002

(Continued)

OTHER PUBLICATIONS

Bang, K. et al., "A Coarse Frequency Offset Estimation in an OFDM System Using the Concept of the Coherence Phase Bandwidth," IEEE Intn'l Conf. on Comm., vol. 2 of 3, Jun. 18, 2000, pp. 1135-1139.

(Continued)

*Primary Examiner*—Young T. Tse
(74) *Attorney, Agent, or Firm*—Sughrue Mion, PLLC

(57) ABSTRACT

An apparatus and method for performing coarse frequency synchronization in an orthogonal frequency division multiplexing (OFDM) receiver are provided. The coarse frequency synchronization apparatus in a frequency synchronizer of an orthogonal frequency division multiplexing (OFDM) receiver includes a buffer that receives a demodulated symbol and outputs a shifted symbol generated by cyclically shifting the symbol by a predetermined shift amount; a controller that determines the length of an summation interval according to a phase coherence bandwidth and a number of sub-bands into which the summation interval is divided, and generates and adjusts a symbol time offset according to the number of sub-bands; a reference symbol predistortion portion that generates a reference symbol whose phase is distorted by the symbol time offset; a counter that counts the shift amount; a partial correlation portion that receives the shifted symbol and the reference symbol and calculates a partial correlation value for each of the sub-bands; and a maximum value detector that calculates the shift amount where the partial correlation value is a maximum and outputs the same as an estimated coarse frequency offset value.

15 Claims, 11 Drawing Sheets

U.S. PATENT DOCUMENTS

| | | | |
|---|---|---|---|
| 6,993,083 B1* | 1/2006 | Shirakata et al. | 375/260 |
| 2004/0120410 A1* | 6/2004 | Priotti | 375/260 |
| 2005/0169408 A1* | 8/2005 | Kim | 375/343 |
| 2007/0036231 A1* | 2/2007 | Ido | 375/260 |

FOREIGN PATENT DOCUMENTS

| | | | |
|---|---|---|---|
| EP | 1 195 961 A2 * | 10/2002 | |
| EP | 1555785 A2 | 7/2005 | |
| JP | 2000236322 | 8/2000 | |

OTHER PUBLICATIONS

You, Y., et al, "Low-complexity Coarse Frequencey-offest Synchronization for OFDM Applications," IEEE Intn'l Conf. on Comm., vol. 1 of 10, Jun. 11, 2001, pp. 2494-2498.

Bang, K., et al., "A Course Frequency Offset Estimation in an OFDM System Using the Concept of the Coherence Phase Bandwidth," IEEE Intn'l Conf. on Comm., vol. 49, No. 8, Aug. 2001, pp. 1320-1324.

Cho, J., et al, "PC-Based Receiver for Erueka-147 Digital Audio Broadcasting," IEEE Trans. on Broadcasting, vol. 47, No. 2, Jun. 2001, pp. 95-102.

* cited by examiner

COARSE FREQUENCY SYNCHRONIZATION METHOD AND APPARATUS IN OFDM SYSTEM

CROSS REFERENCE TO RELATED APPLICATIONS

This application claims priority from Korean Patent Application No. 2003-16287, filed Mar. 15, 2003, the contents of which are incorporated herein by reference in their entirety.

BACKGROUND OF THE INVENTION

1. Field of the Invention

The present invention relates to a coarse frequency synchronization method and apparatus for an orthogonal frequency division multiplexing (OFDM)—based system, and more particularly, to a coarse frequency synchronization method and apparatus in an OFDM receiver.

2. Description of the Related Art

FIG. 1 is a block diagram showing the structure of a conventional OFDM receiver system. Referring to FIG. 1, the conventional OFDM receiver system includes an OFDM demodulator 10 and a frequency synchronizer 12. The OFDM demodulator 10 includes a RF receiver 101, an analog-to-digital converter 102, an I/Q filter 103, a frequency corrector 104, an FFT unit 105, and a Viterbi decoder 106. The frequency synchronizer 12 includes a buffer register 121, a complex data multiplier 122, an IFFT unit 123, a maximum value detector 124, a counter 125, and a reference symbol generator 126.

The operation of the conventional OFDM receiver system of FIG. 1 will now be described. First, when the RF receiver 101 receives a RF signal, the analog-to-digital converter 102 quantizes the received RF signal. The I/Q filter 103 then separates In-phase and Quadrature (I/Q) component signals from the quantized signal. The frequency corrector 104 corrects a frequency error of the filtered signal, and the FFT unit 105 receives the frequency corrected signal and performs a Fast Fourier Transform in order to demodulate the signal. A Viterbi decoder 106 decodes the demodulated signal.

The demodulated signal is stored in the buffer register 121 of the frequency synchronizer 12 and output as a reception signal X. A phase reference symbol output from the reference signal generator 126 is denoted by Z. If the reception signal X has a frame synchronization error of $\omega$ and the k-th signals of X and Z are $X_k$ and $Z_k$, respectively, then $X_k = Z_k e^{-j2\pi kw/N}$. The complex data multiplier 122 multiplies the complex conjugate of Zk by Xk, an inverse FFT (IFFT), denoted by $h_n$, is performed on the result of the multiplication, as shown in Equation 1 below, and then the result of the IFFT is output.

$$h_n = IFFT\{XZ^*\} \qquad (1)$$

$$= 1/N \sum_{k=0}^{N-1} X_k Z_k^* e^{j2\pi kn/N}$$

$$= 1/N \sum_{k=0}^{N-1} Z_k e^{-j2\pi kw/N} Z_k^* e^{j2\pi kn/N}$$

-continued $$= 1/N \sum_{k=0}^{N-1} |Z_k|^2 e^{j2\pi k(n-w)/N}$$

$$= \delta(n-w)$$

In this case, the reception signal $X_k$ containing $\Delta f_i$, which is an integer multiple of frequency error with respect to the transmission signal, is equal to $Z_{k-\Delta f_i} e^{-j2\pi kw/N}$. Thus, Equation (1) can be rewritten as Equation (2):

$$h_n = IFFT\{XZ^*\} \qquad (2)$$

$$= 1/N \sum_{k=0}^{N-1} X_k Z_k^* e^{j2\pi kn/N}$$

$$= 1/N \sum_{k=0}^{N-1} Z_{k-\Delta f_i} e^{-j2\pi kw/N} Z_k^* e^{j2\pi kn/N}$$

The result of Equation (2) is obtained using the process for calculating convolutions of two signals in the time domain, and the resulting value $h_n$ is a channel impulse response (CIR). In this way, the OFDM receiver system that recognizes a frequency domain reference signal can obtain the CIR using the sent reference symbol. Here, if the signal $Z_k$ from a sending end is given as a pseudo noise (PN) sequence so that it has no correlation with k, the result of Equation (2) is a maximum peak value if a frequency error is zero and a sequence of small values which correspond to noise if a frequency error is not zero.

Using this relationship, a maximum value detector 124 detects a maximum peak value by applying Equation (2) after cyclically rotating the reception signal $X_k$ by $\Delta f_i$, and the counter 125 finds a rotation amount $\Delta f_i$ where the maximum peak value occurs. The rotation amount $\Delta f_i$ is an error $F_o$ that is an integer multiple of a frequency error to be detected. The relationship is defined by Equation (3):

$$F_o = \max_{\Delta f_i} \{\max amp[IFFT\{X_R Z\}]\} \qquad (3)$$

where Z denotes a phase reference symbol and $X_R$ denotes a reception symbol made up of terms of $X_{((k+\Delta fi))N}$ obtained by cyclically rotating an individual value $X_k$ of a reception symbol X in the frequency domain by $\Delta f_i$.

A coarse frequency synchronization method according to the conventional OFDM receiver system discussed above makes it possible to actually or theoretically estimate a frequency error in any situation regardless of channel environment and frame synchronization error. However, this method requires a considerable amount of computation. Specifically, this method requires a very complicated IFFT module in order to accurately estimate a frequency error, and causes an excessive time delay due to a long response time.

SUMMARY OF THE INVENTION

The present invention provides a coarse frequency synchronization apparatus in an orthogonal frequency division multiplexing (OFDM) receiver capable of performing stable frequency synchronization with a small amount of computation.

The present invention also provides a coarse frequency synchronization method implemented in the coarse frequency synchronization apparatus.

The present invention also provides an orthogonal frequency division multiplexing receiver that can perform stable synchronization with a small amount of computation.

According to an aspect of the present invention, there is provided a coarse frequency synchronization apparatus in a frequency synchronizer of an orthogonal frequency division multiplexing (OFDM) receiver. The coarse frequency synchronization apparatus includes: a buffer operable to receive a demodulated symbol and output a shifted symbol generated by cyclically shifting the demodulated symbol by a predetermined shift amount; a controller operable to determine a length of summation interval according to a phase coherence bandwidth and a number of sub-bands into which the summation interval is divided, and generate and adjust a symbol time offset according to the number of sub-bands; a reference symbol predistortion portion operable to generate a reference symbol whose phase is distorted by the symbol time offset; a counter operable to determine the shift amount; a partial correlation portion operable to receive the shifted symbol and the reference symbol and calculate a partial correlation value for each of the sub-bands; and a maximum value detector operable to calculate the shift amount where the sum of the partial correlation values is a maximum and output the shift amount as an estimated coarse frequency offset value.

According to another aspect of the present invention, there is provided a coarse frequency synchronization method for use in an OFDM receiver for performing OFDM demodulation and frequency synchronization. The method includes the steps of: (a) receiving a demodulated symbol and outputting a shifted symbol generated by cyclically shifting the symbol by a predetermined shift amount; (b) determining the length of a summation interval according to a phase coherence bandwidth and a number of sub-bands into which the summation interval is divided, and generating a predetermined symbol time offset according to the number of sub-bands; (c) generating a reference symbol whose phase is distorted by the symbol time offset; (d) counting the shift amount; (e) calculating a partial correlation value between the shifted symbol and the reference symbol for each of the sub-bands; and (f) determining the shift amount d where the partial correlation value is a maximum and outputting the shift amount d as an estimated coarse frequency offset value.

According to yet another aspect of the present invention, there is provided an OFDM receiver including a coarse frequency synchronization apparatus. The coarse frequency synchronization apparatus is comprised of: a buffer that receives a demodulated symbol and outputs a shifted symbol generated by cyclically shifting the symbol by a predetermined shift amount; a controller than determines the length of a summation interval according to a phase coherence bandwidth and a number of sub-bands into which the summation interval is divided, and generates and adjusts a symbol time offset according to the number of sub-bands; a reference symbol predistortion portion that generates a reference symbol whose phase is distorted by the symbol time offset; a counter that counts the shift amount; a partial correlation portion that receives the shifted symbol and the reference symbol and calculates a partial correlation value for each of the sub-bands; and a maximum value detector that calculates the shift amount d where the partial correlation value is a maximum and outputs the shift amount d as an estimated coarse frequency offset value.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 1:
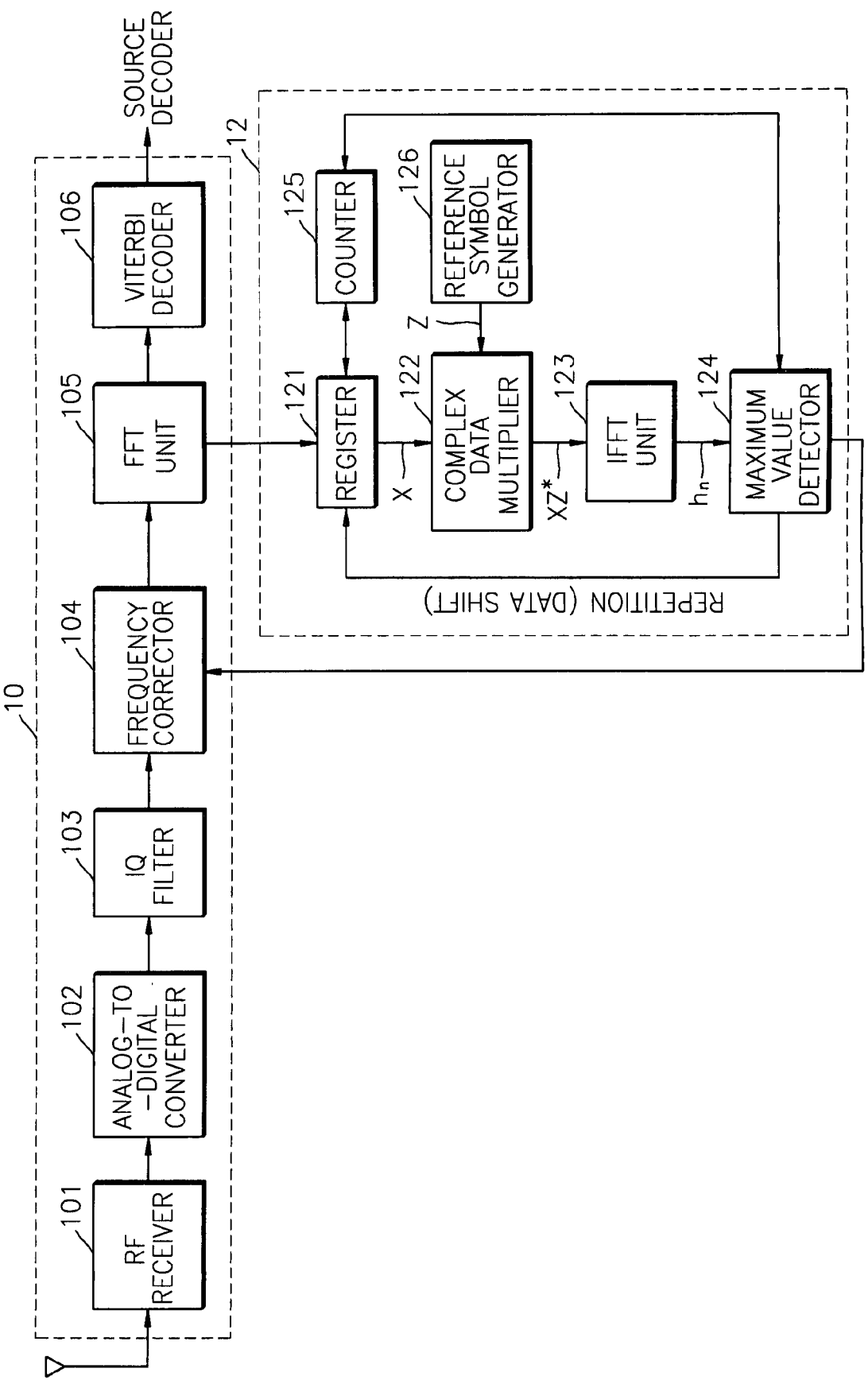
FIG. 1 shows an example of the structure of a conventional orthogonal frequency division multiplexing (OFDM) receiver.

To aid in understanding a coarse frequency apparatus and method according to the present invention, a correlation value and a phase coherence bandwidth applied in accordance with this invention will now be described.

First, to identify the effect of carrier frequency offset of a reception signal, it is assumed that the k-th subcarrrier reception frequency of the reception signal is $f_k+f_{Off}$ where $f_k$ and $f_{off}$ denote a subcarrier frequency and a frequency offset, respectively. A frequency offset value is measured in units of a multiple of spacing of subcarrier frequency. In general, integer and decimal multiples of subcarrier spacing are separately processed. Thus, each term of $f_k+f_{off}$ is defined as follows:

$$f_k = \frac{k}{T_s} \quad (4)$$

$$f_{off} = \Delta f \cdot \frac{1}{T_s} = (\Delta f_i + \Delta f_f) \cdot \frac{1}{T_s},$$

where $\Delta f$ denotes a number that represents the frequency offset of subcarrier by a multiple of subcarrier spacing and can also be replaced by the sum of an integer $\Delta f_i$ and a decimal $\Delta f_f$ that satisfies the condition $-\frac{1}{2} < \Delta f_f < \frac{1}{2}$. Given this condition, a reception signal of an n-th symbol is defined by Equation (5). Here, noise has been neglected for convenience in expanding the equation.

$$r_n(m) = \sum_{k=0}^{N-1} C_{n,k} e^{j2\pi\left(\frac{k}{T_s} + (\Delta f_i + \Delta f_f)\frac{1}{T_s}\right)\frac{T_s}{N}m} \quad (5)$$

$$= \sum_{k=0}^{N-1} C_{n,k} e^{j2\pi(k + \Delta f_i + \Delta f_f)m/N}$$

where $C_{n,k}$ denotes the k-th transmission signal of the n-th symbol in the frequency domain and N denotes the number of subcarriers.

Meanwhile, if the frequency offset does not contain an error represented by an integer multiple, i.e., $\Delta f_i = 0$, a demodulated signal $\hat{C}'_{n,p}$ in is given by Equation (6):

$$\hat{C}'_{n,p} = \frac{1}{N} \sum_{m=0}^{N-1} r_n(m) e^{-j2\pi mp/N} \quad (6)$$

$$= \frac{1}{N} \sum_{m=0}^{N-1} \sum_{k=0}^{N-1} C_{n,k} e^{j2\pi(k + \Delta f_f)m/N} e^{-j2\pi mp/N}$$

$$= \frac{1}{N} \sum_{k=0}^{N-1} C_{n,k} \sum_{m=0}^{N-1} e^{j2\pi(k + \Delta f_f - p)m/N}$$

$$= \frac{1}{N} \sum_{k=0}^{N-1} C_{n,k} \left\{ e^{j\pi(p - k - \Delta f_f)} \frac{\sin(\pi(p - k - \Delta f_f))}{N \sin(\pi/N(p - k - \Delta f_f))} \right\}$$

The demodulated signal $\hat{C}_{n,p}$ in Equation (6) is calculated only when k is an integer. Thus, if the frequency error $\Delta f_f$ is zero, a non-zero output is generated at a frequency where k=p while the output equals zero at all other frequencies, thus maintaining orthogonality among frequencies. However, if the frequency error $\Delta f_f$ is not zero, the amplitude of the output at the frequency where k=p decreases, and a non-zero output is generated at other frequencies. These values cause interference between subcarriers, leading to inter-channel interference (ICI). The demodulated signal $\hat{C}'_{n,p}$ is obtained from the reception signal as follows:

$$\hat{C}_{n,p} = \frac{1}{N} \sum_{m=0}^{N-1} r_n(m) e^{-j2\pi mp/N} \quad (7)$$

$$= \frac{1}{N} \sum_{m=0}^{N-1} \sum_{k=0}^{N-1} C_{n,k} e^{j2\pi km/N} e^{j2\pi(\Delta f_f)m/N} e^{-j2\pi m(p - \Delta f_i)/N}$$

$$= \hat{C}'_{n, p - \Delta f_i}$$

This means the frequency error represented by an integer multiple of frequency error causes a signal intended for demodulation to be shifted by $-\Delta f_i$, where $\Delta f_i$ is an integer. In particular, since Equation (7) includes a Discrete Fourier Transform (DFT) process, the shift in this equation is a cyclic shift.

Thus, in a coarse frequency synchronization method according to this invention, a correlation value is calculated by sequentially rotating the already known phase reference symbol and reception signal by symbol intervals, and the amount of rotation where the maximum correlation value occurs is determined as an integer multiple of frequency error. This relationship is defined by Equation (8):

$$\max_d \left\{ \sum_{k=0}^{N-1} X(((k+d))_N) Z^*(k) \right\}, \quad (8)$$

where $((k+d))_N$ is a sign representing a modulo-N summation operation, X(k) is the k-th reception signal after performing a DFT, and Z(k) is the k-th phase reference signal. Also, X(k) and Z(k) are frequency domain signals. However, this method can correct a frequency error when frame synchronization occurs but it cannot when frame synchronization does not occur. This problem can be solved by analyzing a phase coherence bandwidth for the reception signal and phase reference signal.

The phase coherence bandwidth for the reception signal and phase reference signal in a digital audio broadcasting (DAB) system using OFDM will now be described. In general, channel coherence bandwidth refers to a statistically measured frequency band where a channel can be deemed as 'flat' or passes two signals so that they have approximately the same gain and linear phase over all spectrum components. That is, a channel coherence band is a frequency band in which two different frequency components have a strong correlation. In this case, assuming that the coherence band of a channel is $B_c$, two sine waves having frequency spacing larger than that of coherence band $B_c$ are affected within the channel in different ways. Thus, the correlation between the two reception signals cannot be ensured.

A phase coherence bandwidth is defined as a frequency interval where two signals having a delay in the time domain and generated by performing a DCT on the same signal maintain their correlation in the frequency domain. Analogous to the channel coherence band, it can also mean a frequency band in which the two signals have a strong correlation.

Let a time domain signal in the OFDM system be z(t), a delayed signal having a frequency error of $T_{off}$ with respect to z(t) be $z(t+T_{off})$, and a frequency domain signal that has undergone a DCT be Z(k), a signal generated by performing a DFT on $z(t+T_{off})$ is given by Equation (9):

$$DFT\{z(t + T_{off})\} = \sum_{k=0}^{N-1} e^{j2\pi k T_{off}/N} Z(k) \quad (9)$$

Here, for convenience in expanding the equation, both noise and frequency error are neglected, and N denotes the number of subcarriers.

As described above, the phase coherence bandwidth is defined as a frequency band in which two signals always have a strong correlation. That is, if a frequency band B has the largest bandwidth where a correlation value of the two signals $Z(k)$ and $e^{j2\pi k T_{off}/N} Z(k)$ is always greater than or equal to a threshold, the frequency band B is a phase coherence bandwidth. This relationship is expressed by Equation (10):

$$\left| \sum_{k=m}^{m+B-1} Z^*(k) e^{j2\pi k T_{off}/N} Z(k) \right| \geq T_C, \text{ for all } m \quad (10)$$

$$0 \leq m \leq N - B, 0 \leq B \leq N$$

where $T_C$ denotes a threshold and N denotes the number of subcarriers. If an OFDM signal satisfies $|Z(k)|=1$, the left side of Equation (10) can be expanded as shown in Equation (11):

$$\left| \sum_{k=m}^{m+B-1} Z^*(k) e^{j2\pi k T_{off}/N} Z(k) \right| = \left| \sum_{k=M}^{m+B-1} e^{j2\pi k T_{off}/N} \right| = \quad (11)$$

$$\sqrt{\left| \sum_{k=m}^{m+B-1} \cos(2\pi k T_{off}/N) \right|^2 + \left| \sum_{k=m}^{m+B-1} \sin(2\pi k T_{off}/N) \right|^2}$$

$$0 \leq m \leq N - B, 0 < B \leq N$$

These requirements are applicable to a DAB system. Since in Equation (11) the lower bound m of the summations is not fixed, the relation between the frame synchronization error $T_{off}$ and a summation interval K is not clear. Thus, Equation (11) can be rewritten as Equation (12), in which the summations have a lower bound of zero.

$$\sqrt{\left| \sum_{k=m}^{m+B-1} \cos(2\pi k T_{off}/N) \right|^2 + \left| \sum_{k=m}^{m+B-1} \sin(2\pi k T_{off}/N) \right|^2} = \quad (12)$$

$$\sqrt{\left( \sum_{k=0}^{B-1} \cos 2\pi k T_{off}/N \right)^2 + \left( \sum_{k=0}^{B-1} \sin 2\pi k T_{off}/N \right)^2}$$

Furthermore, Equation (12) can be combined with Equation (10) to yield Equation (13) which can be used to obtain a phase coherence bandwidth with respect to changes in a frame synchronization error:

$$\sqrt{\left( \sum_{k=0}^{B-1} \cos 2\pi k T_{off}/N \right)^2 + \left( \sum_{k=0}^{B-1} \sin 2\pi k T_{off}/N \right)^2} \geq T_C \quad (13)$$

The left side of Equation (13) is a correlation function of two signals $z(t)$ and $Z(t+T_{off})$ in the frequency domain with respect to the summation interval K where $Z(t+T_{off})$ is a delayed signal having a frequency error of $T_{off}$. That is, the phase coherence bandwidth refers to a frequency band B where the correlation function of the two signals having the frame synchronization error $T_{off}$ expressed in Equation (13) is always greater than or equal to the threshold $T_C$.

Figure 2:
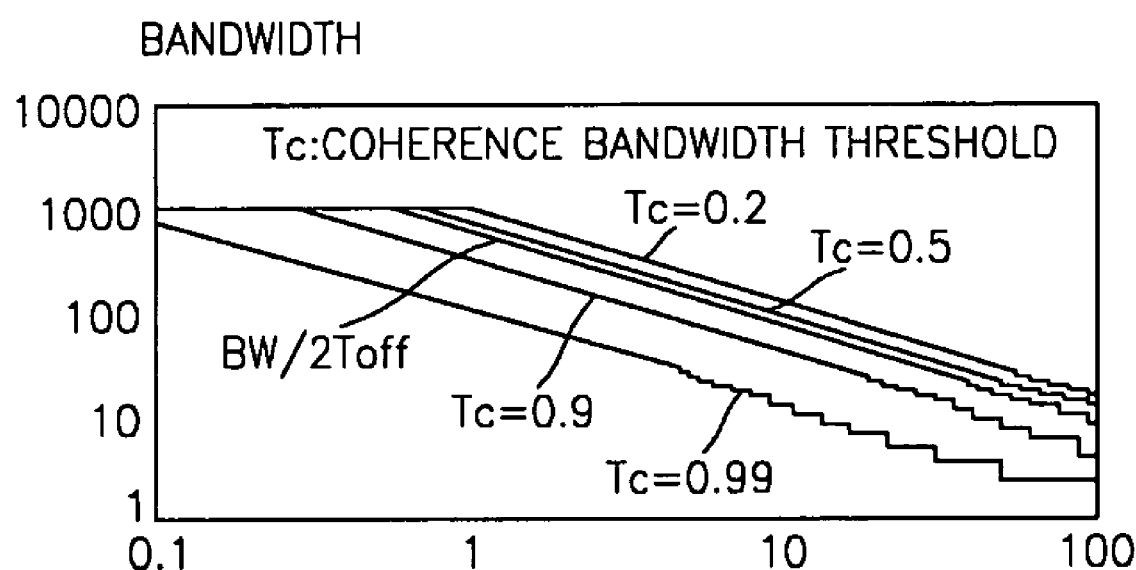
FIG. 2 is a graph illustrating the relationship between phase coherence bandwidth and time offset between an original signal and a delayed signal having a frame synchronization error with respect to the original signal, in order to explain a coarse frequency synchronization apparatus and method according to the present invention.

FIG. 2 is a graph showing computer simulation results of the relation in Equation (13). The graph illustrates the relationship between phase coherence bandwidth and time offset between an original signal and a signal having a frame synchronization error with respect to the original signal. Referring to FIG. 2, a bandwidth is represented by a multiple of subcarrier spacing, and the entire frequency band of a channel is set to 1024. Furthermore, when coherence bandwidth thresholds are set to 0.2, 0.5, 0.9, and 0.99, respectively, the corresponding bandwidths are calculated for a signal time offset that ranges from zero to 100.0 samples. As is evident from the graph, as the coherence bandwidth threshold increases, phase coherence bandwidth decreases.

To reveal the fact that there is a reciprocal relationship between a time delay factor and coherence bandwidth, FIG. 2 shows the relationship between coherence bandwidth and a time offset $T_{off}$ that is the time delay factor. The relationship is represented by BW/2$T_{off}$. In this relationship represented by BW/2$T_{off}$, bandwidth changes with respect to a time offset in a manner similar to when the coherence bandwidth threshold $T_C$ is 0.5. Thus, the phase coherence bandwidth in the present invention is approximated as $$\frac{1}{2T_{off}} \times BW.$$

Meanwhile, it is assumed that $z(t)$ and $x(t)$ are a reference signal and a reception signal generated by performing IFFT on the phase reference signal $Z(k)$ and signal $X(k)$ in Equation (8), respectively. It is further assumed that the reception signal $x(t)$ has a time delay, i.e., frame synchronization error. Given these assumptions, there is a reciprocal relation between a frame synchronization error $\Delta t$ and phase coherence bandwidth on the frequency axis. This relationship means that as the frame synchronization error $\Delta t$ increases, phase coherence bandwidth on the frequency axis decreases.

Figure 5:
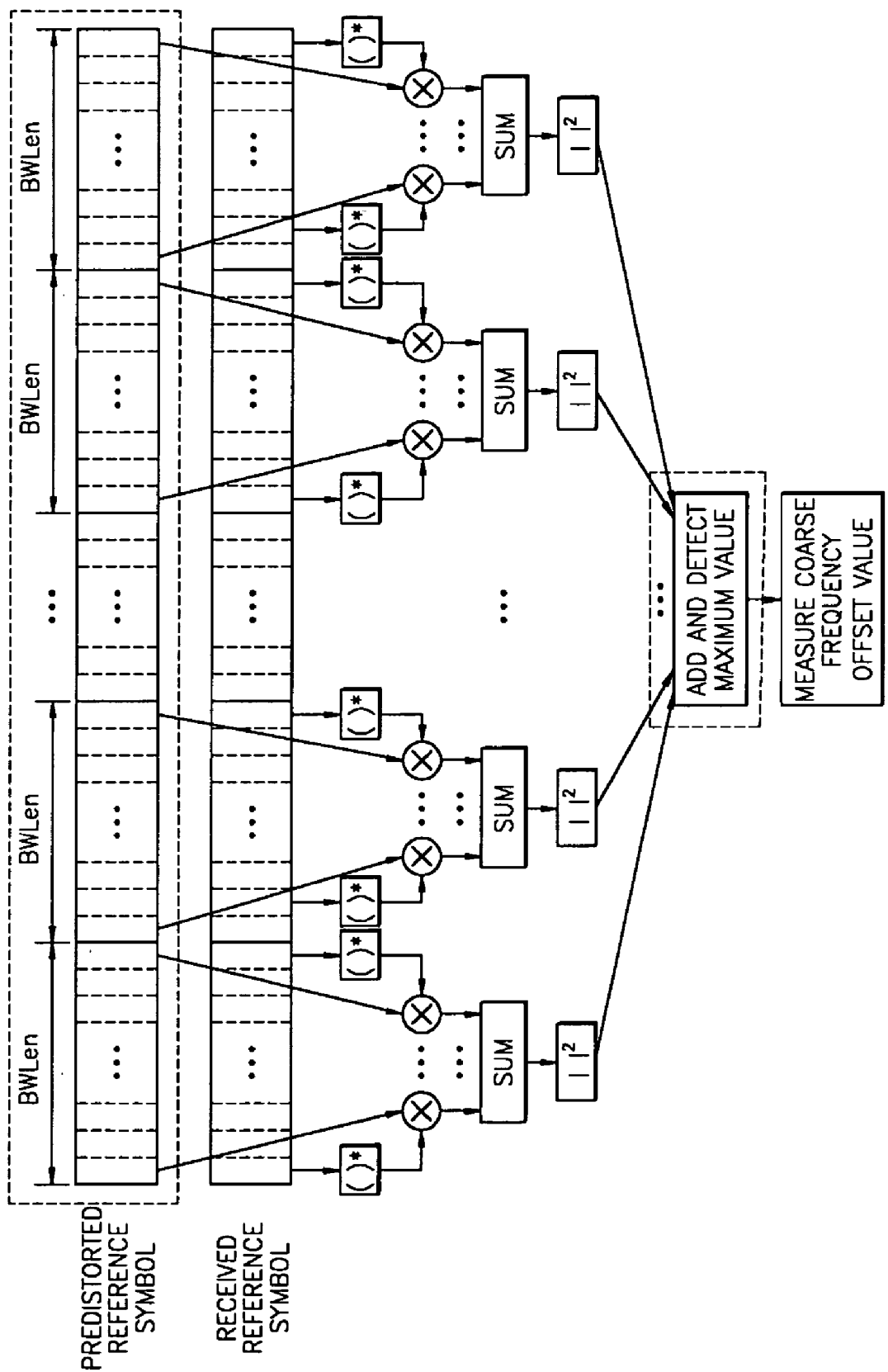
FIG. 5 schematically shows a process of calculating the correlation between a received reference symbol and a predistorted reference symbol according to the present invention.

The coarse frequency synchronization method of the present invention is based on coarse frequency synchronization using a correlation value between reference signals. Referring to FIG. 5, when calculating a correlation value according to the present invention, a summation interval BWLen is set to be smaller than a phase coherence bandwidth calculated for a reference symbol and a reception symbol having a time offset. That is, in order to calculate a correlation value between a shifted reception symbol and a reference symbol, the summation interval is divided into a plurality of intervals that are smaller than a phase correlation bandwidth of two signals, partial correlation values are calculated for each small interval resulting from the division, and an average or sum of the partial correlation values is taken to determine a shift amount where the maximum correlation value is generated.

Since this method excludes a decorrelation band where accurate frame synchronization between reference and reception symbols is not achieved, the correlation function value is always meaningful. Thus, coarse frequency synchronization is accurately performed within the range of a time offset that can be tolerated in frame synchronization.

These principles are applied to the coarse frequency synchronization apparatus and method of the present invention.

Furthermore, in order to estimate a coarse frequency offset, the present invention generates a predistorted phase reference. First, the effect of symbol distortion with respect to a time offset will now be described with reference to FIG. 6.

Figure 6:
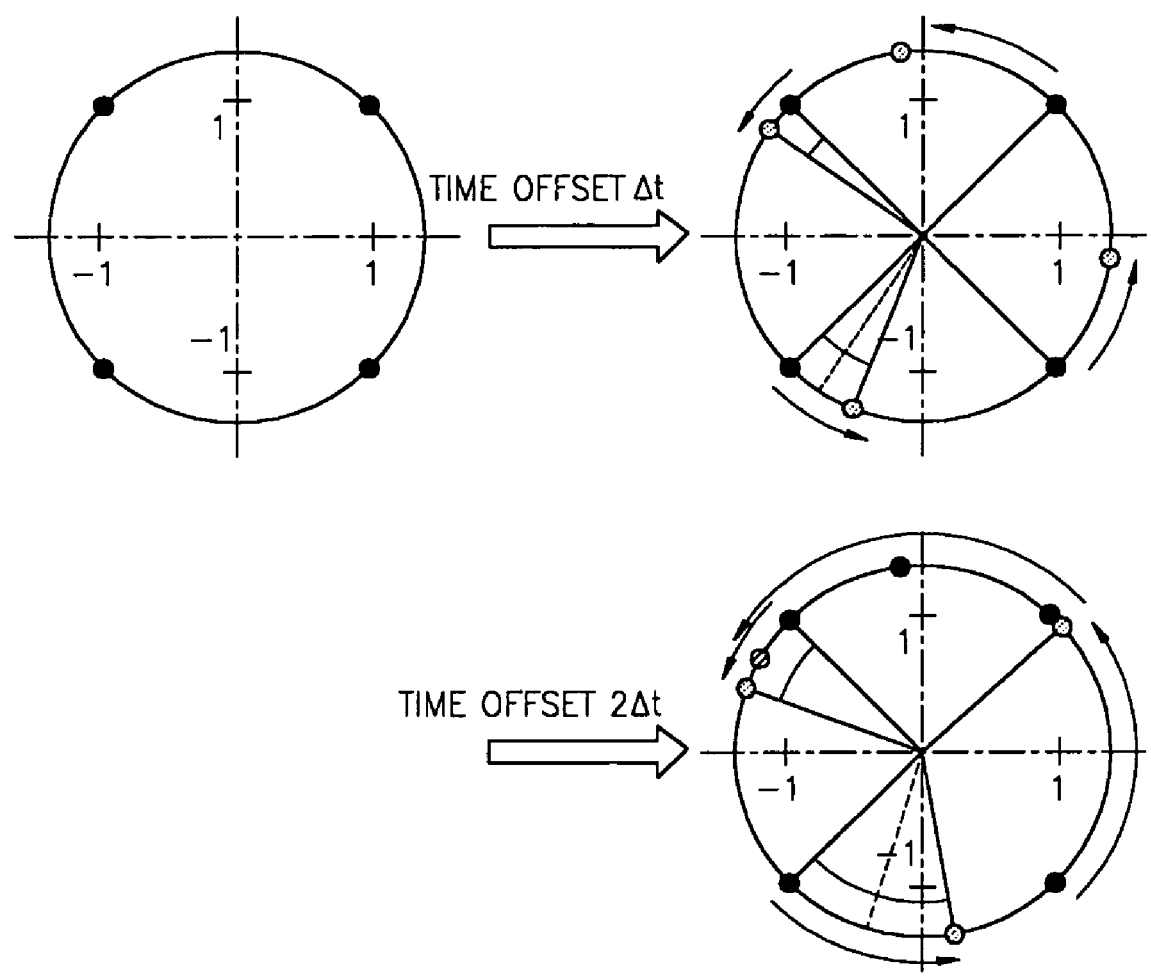
FIG. 6 explains the effect of symbol distortion with respect to a time frequency error.

As shown in FIG. 6, a time offset in OFDM causes phase rotation in proportion to the order of a subcarrier in a sequence of subcarriers. For mathematical convenience, it is assumed that only one symbol interval of the entire signal is used, a transmission channel is an Additive White Gaussian Noise (AWGN) channel, and accurate frequency synchronization in a reception signal is achieved. If time synchronization does not occur in an OFDM system, a reception signal $r_n(t)$ in the n-th symbol interval is defined by Equation (14):

$$r_n(t) = \sum_{k=0}^{N-1} C_{n,k} \psi'_{n,k}(t) + n(t) \tag{14}$$

where N is the number of subchannels, $C_{n,k}$ is a signal in the n-th symbol transmitted through the k-th subchannel, $\Psi'_{n,k}$ is the k-th subcarrier signal, and n(t) is AWGN with variance $\sigma_n^2$. Equation (14) can be rewritten as Equation (15):

$$r_n(t) = \sum_{k=0}^{N-1} C_{n,k} e^{j2\pi f_k t} + n(t) \tag{15}$$

where $f_k$ is a subcarrier frequency and equal to $f_k = k/T_s$.

Here, in order to observe the effect of time synchronization on the reception signal, it is assumed that sampling is performed with a period $$t = \frac{T_s}{N} m + \tau.$$

In this case, $T_s$ is an OFDM symbol period, m is the sampling order, and $\tau$ is a sampling error that is a time offset.

While satisfying the above conditions, a discrete signal generated by sampling the reception signal expressed in Equation (15) is given by Equation (16):

$$r_n(m) = \sum_{k=0}^{N-1} C_{n,k} e^{j2\pi \frac{k}{T_s} \left(\frac{T_s}{N} m + \tau\right)} + n(m) \tag{16}$$

$$= \sum_{k=0}^{N-1} C_{n,k} e^{j2\pi km/N} e^{j2\pi k\tau/T_s} + n(m)$$

A demodulated signal $\hat{C}'_{n,p}$ obtained from the reception signal is thus expressed by Equation (17):

$$\hat{C}'_{n,p} = \sum_{k=0}^{N-1} r_n(m) e^{-j2\pi mp/N} \tag{17}$$

-continued $$= \sum_{k=0}^{N-1} C_{n,k} e^{j2\pi k\tau/T_s} \frac{1}{N} \sum_{m=0}^{N-1} e^{j2\pi m(k-p)/N} + P_n(p)$$

Here $$\sum_{k=0}^{N-1} e^{j2\pi m(k-p)/N}$$

is expressed by Equation (18):

$$\sum_{m=0}^{N-1} a^m = \begin{cases} N, & \text{if } a = 1 \\ \frac{1-a^N}{1-a} & \text{if } a \neq 1 \end{cases} \tag{18}$$

Here, a in Equation (18) is given by Equation (19):

$$a = e^{j2\pi(k-p)/N} \tag{19}$$

That is, since k, p, and N are all integers in Equation (19), k−p needs to be an integer multiple of N such that a=1. Otherwise, $a^N=1$ for any value of a satisfying a ≠1, as shown in Equation (20):

$$\sum_{m=0}^{N-1} e^{j2\pi m(k-p)/N} = \begin{cases} N, \text{if } k = p \mid \alpha N, \alpha \text{ is integer} \\ 0, \text{otherwise} \end{cases} \tag{20}$$

Since it is possible to apply the conditions of Equation (20) to Equation (17) only if α=0, the result is expressed by Equation (21):

$$\hat{C}'_{n,p} = \sum_{k=0}^{N-1} C_{n,k} e^{j2\pi k\tau/T_s} \frac{1}{N} \sum_{m=0}^{N-1} e^{j2\pi m(k-p)/N} + P_n(p) \tag{21}$$

$$= \sum_{k=0}^{N-1} C_{n,k} e^{j2\pi k\tau/T_s} \frac{1}{N} \cdot N \cdot \delta(k-p) + P_n(p)$$

$$= C_{n,p} e^{j2\pi p\tau/T_s} + P_n(p)$$

Furthermore, the term $P_n(p)$ in Equation (17) that is a value generated by converting noise n(m) to a frequency domain is AWGN having the same variance as the noise n(m) that is also AWGN. Thus, the effect of noise is not directly related to time synchronization of an OFDM signal.

Therefore, it is evident from Equation (21) that due to the effect of an error occurring when time synchronization is not achieved, the reception signal $\hat{C}'_{n,p}$ is demodulated by rotating the phase of a transmission signal $C_{n,p}$ to be demodulated. In this case, the amount of phase rotation is determined as a value proportional to the product of a time offset $\tau$ and the position p of a subchannel.

That is, the reception signal in Equation (21) suffers phase rotation due to a time offset. The phase is rotated by τ*p in proportion to the order p of subcarriers. Thus, the present invention generates a reference symbol whose phase has been predistorted and uses the reference symbol in detecting coarse frequency synchronization, thus allowing more accurate frequency synchronization detection. Here, $\tau$ corresponds to a symbol time offset $\Delta t_i$ that will be described later.

Figure 3A:
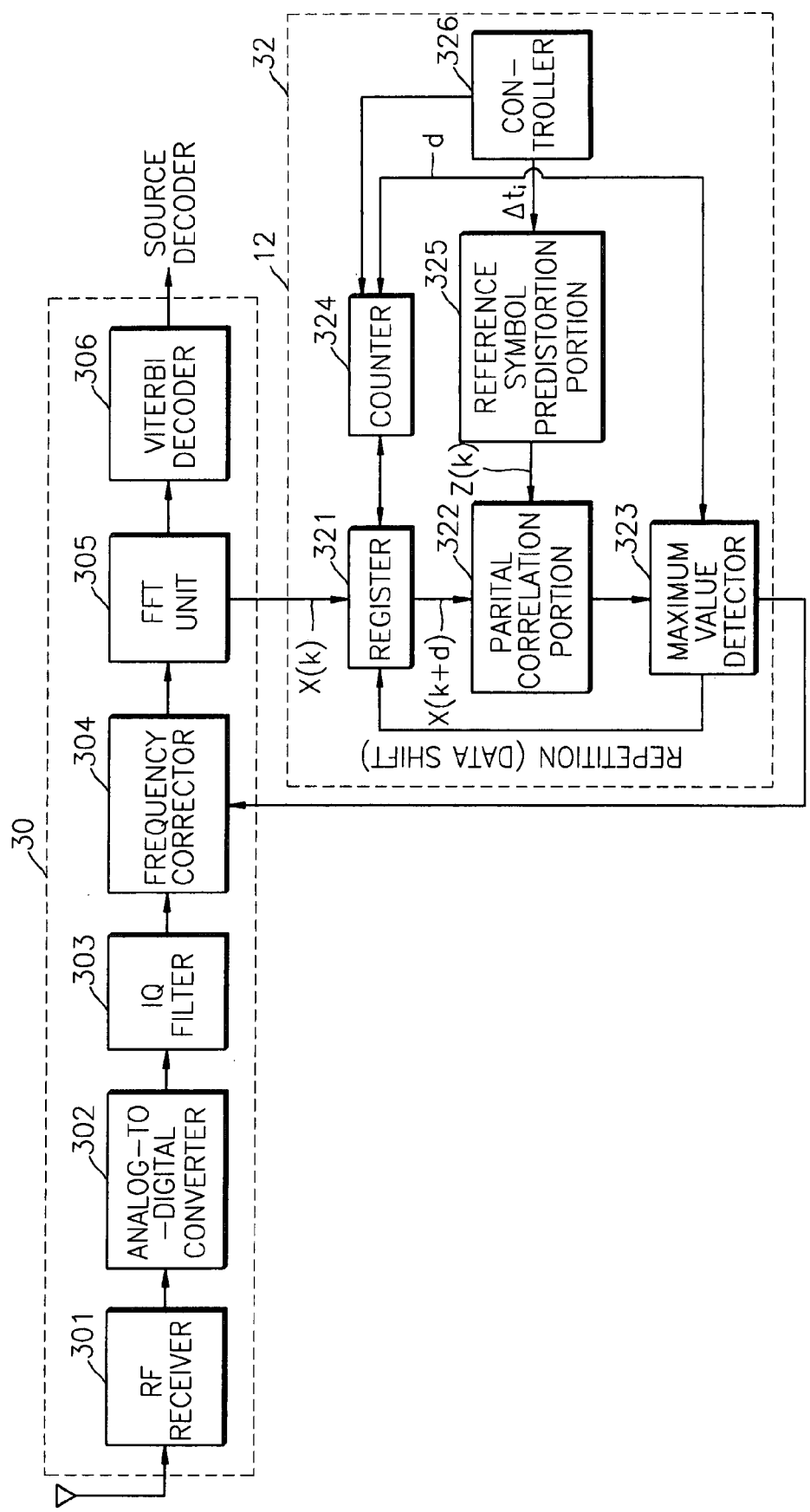
FIG. 3A is a block diagram showing the structure of an OFDM receiver having a coarse frequency synchronization apparatus according to an embodiment of the present invention.
Figure 4:
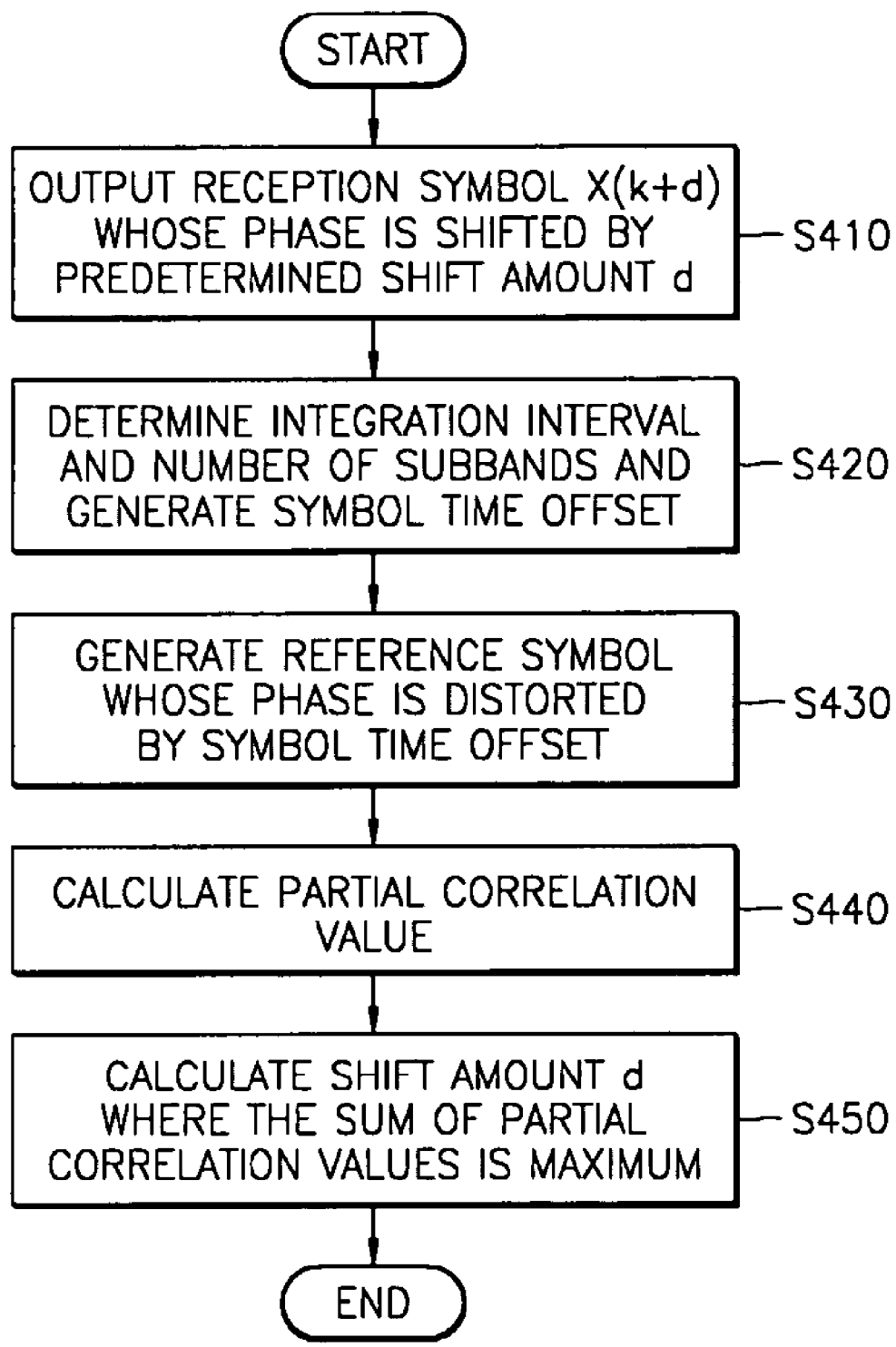
FIG. 4 is a flowchart illustrating a coarse frequency synchronization method according to an embodiment of the present invention.

A coarse frequency synchronization apparatus and method according to a preferred embodiment of the present invention will now be described with references to FIGS. 3A and 4. FIG. 3A is a block diagram showing an example of the structure of an OFDM receiver having the coarse frequency synchronization apparatus according to an embodiment of the invention. The OFDM receiver shown in FIG. 3A is comprised of an OFDM demodulator 30 and a frequency synchronizer 32. The OFDM demodulator 30 consists of an RF receiver 301, an analog-to-digital converter 302, an I/Q filter 303, a frequency corrector 304, an FFT unit 305, and a Viterbi decoder 306. The frequency synchronizer 32 consists of a register 321, a partial correlation portion 322, a maximum value detector 323, a counter 324, a reference symbol predistortion portion 325, and a controller 326.

Since the OFDM demodulator 30 operates in the same fashion as the conventional OFDM demodulator 10 shown in FIG. 1, a detailed description will be omitted. The operation of the frequency synchronizer 32 according to this invention will now be described with reference to FIG. 4, which is a flowchart illustrating the coarse frequency synchronization method in the OFDM receiver.

In step S410, a reception symbol X(k) received from the OFDM demodulator is input to the register 321, and the register 321 cyclically shifts the reception symbol X(k) by a predetermined shift amount d and outputs the shifted symbol X(k+d) to the partial correlation portion 322.

In step S420, the controller 326 calculates the length of a summation interval for the phase coherence bandwidth, determines the number K of sub-bands into which the summation interval is divided, generates a predetermined symbol time offset according to the number of sub-bands, and outputs the symbol time offset to the reference symbol predistortion portion 325.

In step S430, the reference symbol predistortion portion 325 generates a reference symbol Z(k) whose phase is distorted by the input symbol time offset and outputs the reference symbol Z(k) to the partial correlation portion 322. The configuration and operation of the reference symbol predistortion portion 325 will be described later with reference to FIG. 3B.

In step S440, assuming that N is the number of subcarriers and the predetermined shift amount d of the shifted signal received by the partial correlation portion 322 is $$-\frac{2}{N} \text{ or } \frac{2}{N},$$

the partial correlation portion 322 calculates a partial correlation value between the shifted reception symbol X(k+d), generated by the register 321 shifting X(k) by the predetermined shift amount d, and the predistorted reference symbol Z(k), received from the reference symbol predistortion portion 325, while counting the shift amount d for each of the K sub-bands, or calculating the sum $$\sum_{m=0}^{K-1} \left| \sum_{k=m(N/K)}^{(m+1)(N/K)-1} X(((k=d))_N) Z^*(k) \right|$$

of partial correlation values.

In step S450, the maximum value detector 323 then determines a shift amount d where the sum received from the partial correlation portion 322 has a maximum value, and outputs the determined shift amount d as an estimated coarse frequency offset value.

According to the present invention, an algorithm for calculating Equation (22) is repeated a number of times predetermined by the controller 326 to calculate a coarse frequency offset value.

$$\max_{d} \left\{ \sum_{m=0}^{K-1} \left| \sum_{k=m(N/K)}^{(m+1)(N/K)-1} X(((k+d))_N) Z^*(k) \right| \right\}, \quad (22)$$

where N is the number of subcarriers, K is the number of sub-intervals into which the interval of summation with respect to a correlation function is divided, and N/K is a sub-interval BWLen (See FIG. 5) of the summation. Thus, assuming that an individual sub-band width is $BW_s$, each sub-band width $BW_s$ equals BW/K where BW is the entire band of a channel.

Figure 3B:
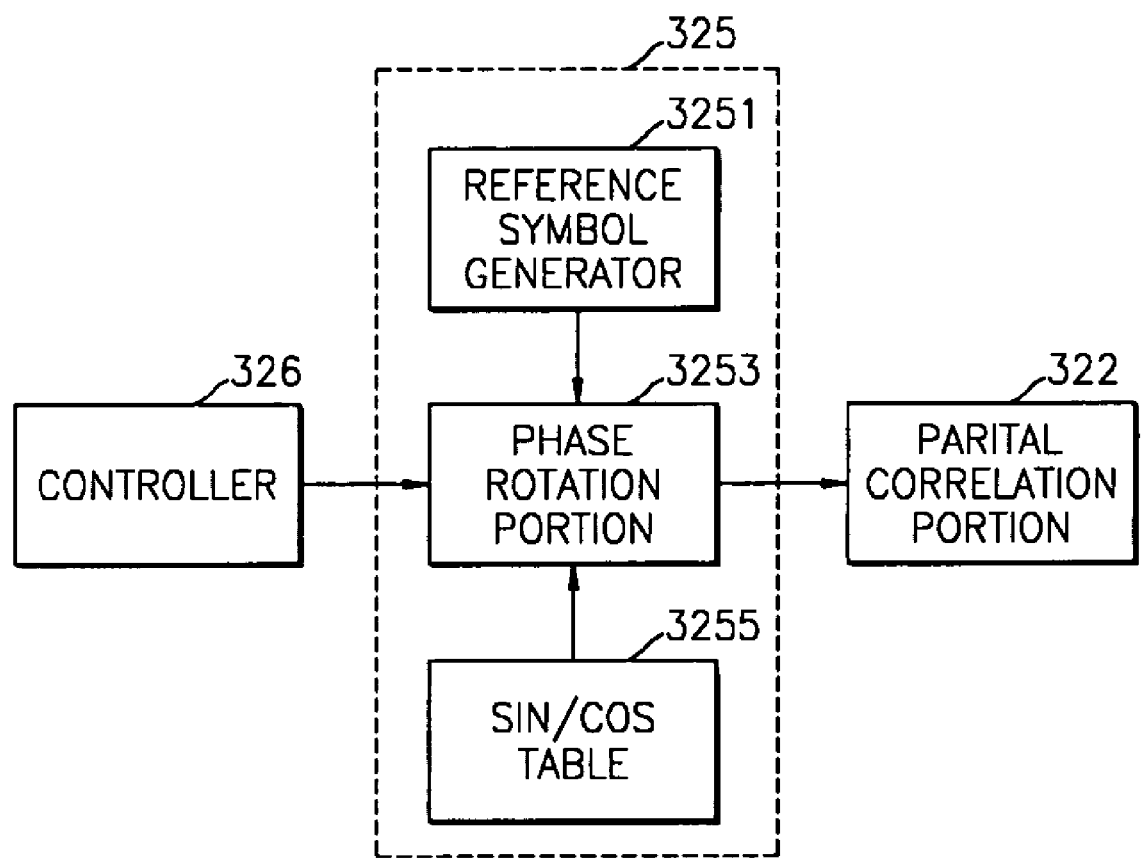
FIG. 3B is a detailed block diagram showing the structure of a reference symbol predistortion portion shown in FIG. 3A.

The configuration and operation of the reference symbol predistortion portion 325 according to preferred embodiment the present invention shown in FIG. 3A will now be described with reference to FIG. 3B. The reference symbol predistortion portion 325 includes a reference symbol generator 3251 that generates the same reference symbol as a reference symbol sent from a transmitter, a phase rotation portion 3253 that shifts the phase of a phase reference symbol by the symbol time offset received from the controller 326 and generates a phase-distorted reference symbol, and a sin/cos table 3255 that outputs sin and cos values, calculated according to phase values used for phase rotation, to the phase rotation portion 3253.

The process of predistorting the reference symbol will now be described. The controller 326 determines sub-intervals BWLen of summation based on the phase coherence bandwidth, divides the entire interval of summation into sub-intervals, and determines the number of sub-bands. The controller 326 further calculates a symbol time offset that can be tolerated according to the number of sub-bands, and determines $\Delta t_i$ using the calculated symbol time offset. Here, (+) and (−) time offsets may occur so that the time offset is actually generated as $\pm \Delta t_i$. The controller 326 then outputs the generated time offset $\Delta t_i$ to the phase rotation portion 3253.

The phase rotation portion 3253 generates a phase-distorted reference symbol by rotating the phase reference symbol received from the reference symbol generator 3251 by $\Delta t_i$ and outputs the same to the partial correlation portion 322. Specifically, the phase rotation portion 3253 uses the input $\Delta t_i$ and inversely shifts the phase of each subcarrier. As in the above equation $\hat{C}'_{n,p} = C_{n,p} e^{j2\pi p\tau/T_s}$, the phase of the phase reference symbol (PRS) is rotated to $\hat{C}'_{n,p} = C_{n,p} e^{j-2\pi p\times ti/T_s}$. In this case, $C_{n,p}$ is a phase reference symbol and $\hat{C}'_{n,p}$ is a predistorted phase reference symbol generated by rotating the phase by $e^{j-2\pi p\Delta ti/T_s}$.

Although it has been described that the phase rotation portion 3253 generates a phase-distorted reference signal using the above equation, in an actual embodiment, the reference symbol is generated according to the order of subcarriers, and the phase rotation portion 3253 generates a complex number $e^{j-2\pi p\Delta ti/T_s}$ corresponding to the position of each subcarrier, by which the phase is rotated. Then, $e^{j-2\pi p\Delta ti/T_s}$ is multiplied by the reference symbol to generate a predistorted phase reference symbol. Since the complex number $e^{j-2\pi p\Delta ti/T_s}$ is not suitable for use in an actual embodiment, complex number multiplication is performed after representing it in the form of cos θ+j sin θ. In this case, values of cos θ and sin θ are obtained by referring to the sin/cos table 3255.

Figure 7A:
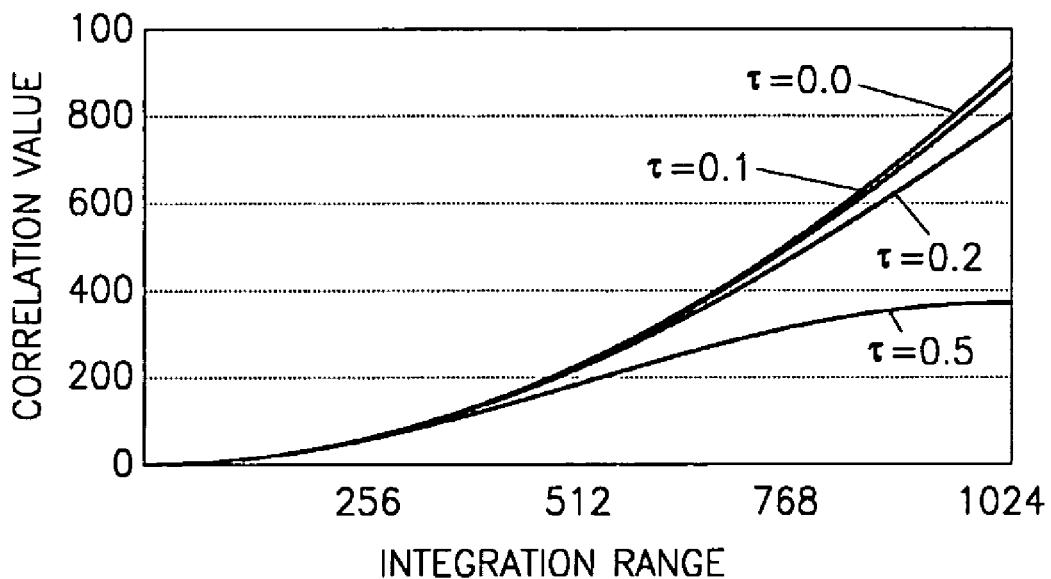
FIGS. 7A and 7B show correlation between a reference symbol and a reception symbol with respect to changes in a symbol time offset.
Figure 7B:
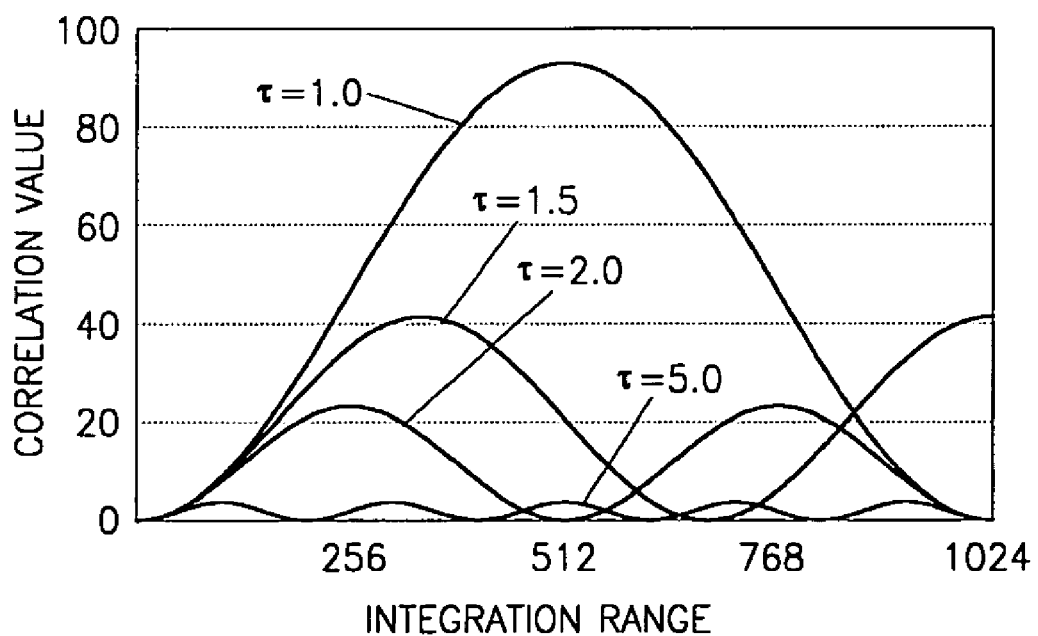

FIGS. 7A and 7B show correlation between the reference signal and the reception signal with respect to change in symbol time offset. It is evident from these figures that coherence bandwidth varies with symbol time offset. Thus, by performing a coarse frequency synchronization algorithm after setting an appropriate coherence bandwidth, a coarse frequency offset can be effectively estimated.

Figure 8A:
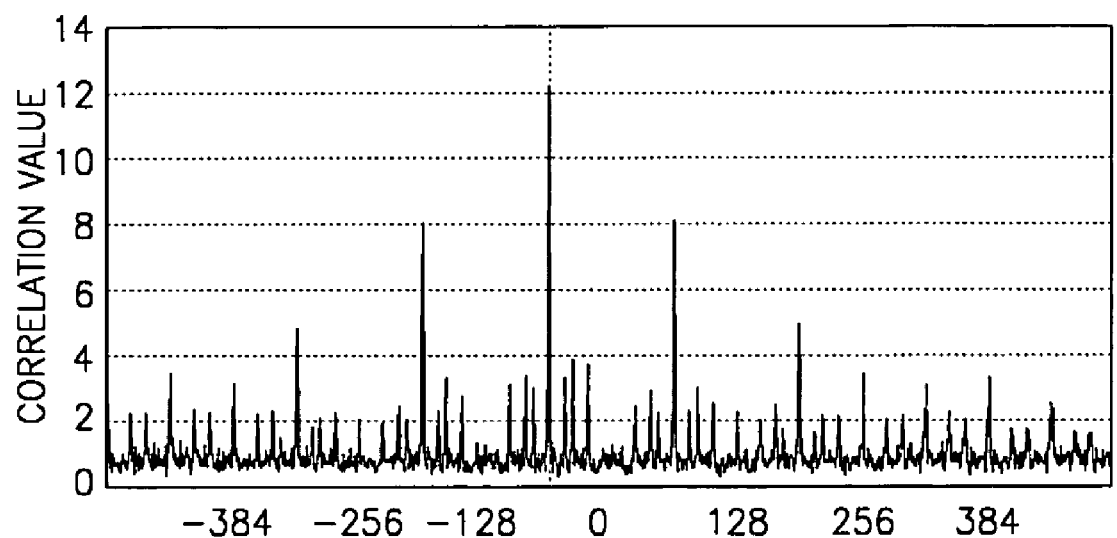
FIGS. 8A and 8B show results of a simulation of a coarse frequency offset value detection method of the present invention.
Figure 8B:
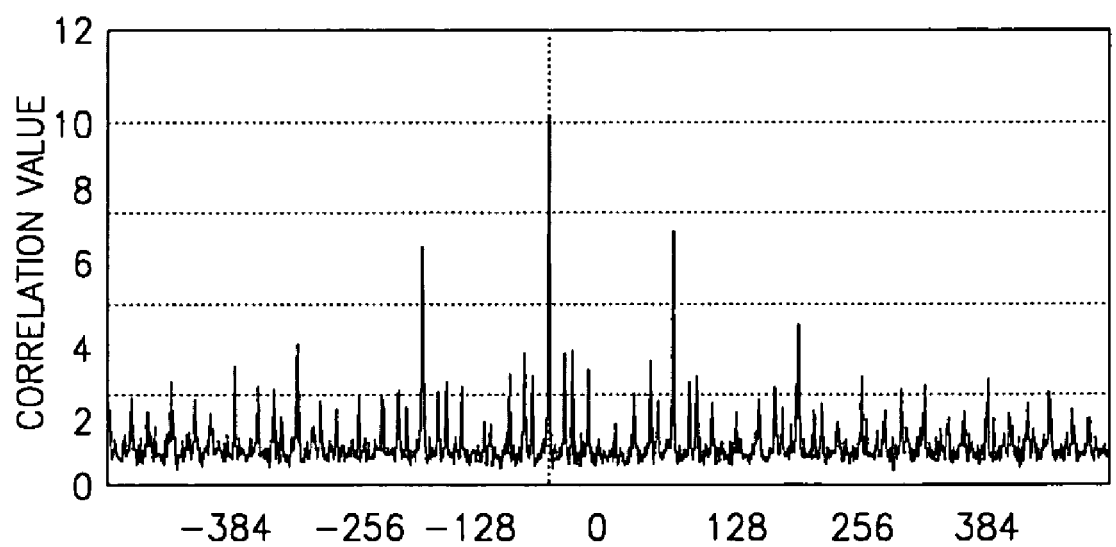

To check if a coarse frequency offset value can be properly detected by the coarse frequency synchronization apparatus and method of this invention, a simulation was performed. FIGS. 8A and 8B are graphs illustrating the results of this simulation. For the purpose of comparison, FIGS. 9A and 9B show the results of a simulation performed according to a conventional coarse frequency offset value detection method.

The simulations were performed under the conditions that signal-to-noise (SNR) ratio is 5 dB in a Gaussian channel, the number of subcarriers is 1024, and a frequency error is −62.4 times the number of subcarriers. The simulation results shown in FIGS. 8A and 9A are for a symbol time offset of 0.0, and the simulation results shown in FIGS. 8B and 9B are for a symbol time offset of 10.0. For the simulation of coarse frequency offset value detection according to the conventional frequency synchronization method, a correlation function over the entire band in a Gaussian channel was applied. For the simulation of coarse frequency offset value detection according to the coarse frequency synchronization method of the present invention, the entire channel bandwidth was divided into 32 subbands, and the sum of correlation values for each subband was calculated. In the graphs, frequency is plotted on the horizontal axis and correlation value is plotted on the vertical axis. In this case, since the given frequency offset value is −62.4, if a maximum peak value is generated at a value of −62 on the horizontal axis, it means that a coarse frequency offset value is accurately detected.

Referring to FIGS. 8A and 8B, the results of the simulation performed according to the coarse frequency synchronization method of the present invention show that a maximum value occurs at the value of −62 on the horizontal axis, corresponding to the given frequency offset value in the case of no time offset as shown in FIG. 8A as well as in the case of a time offset of 10.0 as shown in FIG. 8B. This shows that the coarse frequency offset value is accurately detected in the present invention.

Figure 9A:
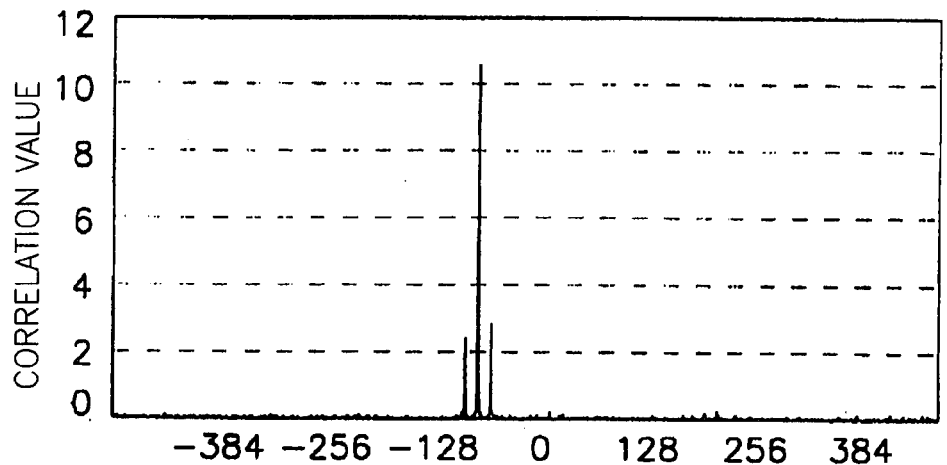
FIGS. 9A and 9B show results of a simulation of a conventional coarse frequency offset value detection method.
Figure 9B:
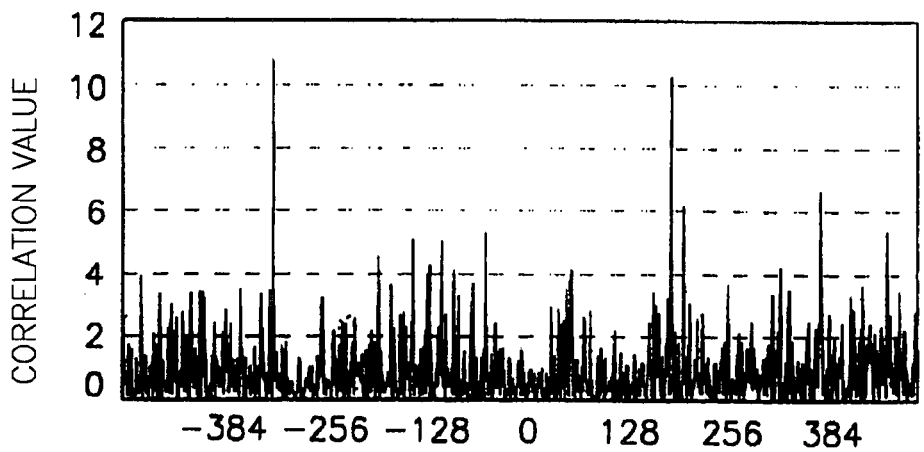
Figure 10A:
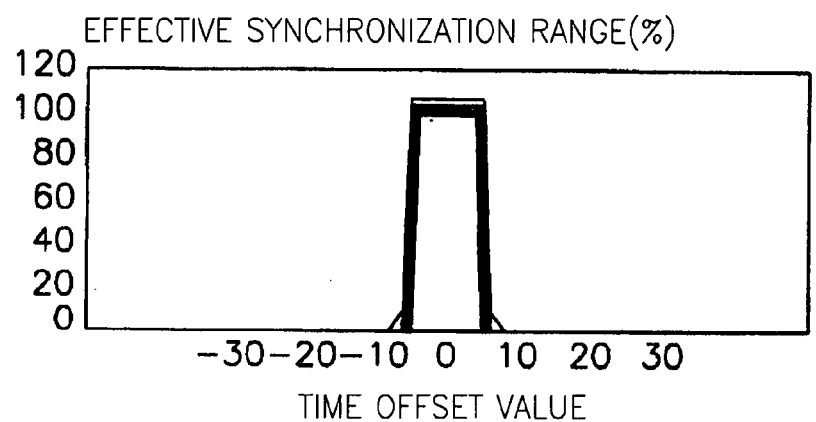
FIGS. 10A-10D are graphs showing both theoretical and simulated percentage probabilities of accurately detecting a frequency offset value using a coarse frequency synchronization method according to the present invention versus frame synchronization error.
Figure 10B:
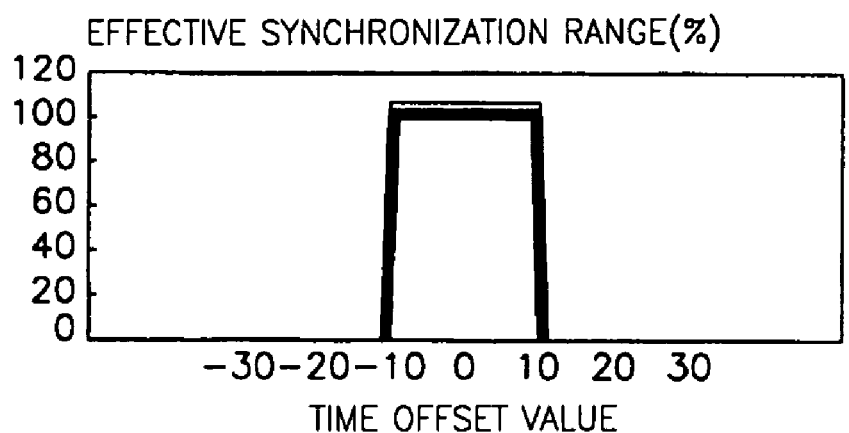
Figure 10C:
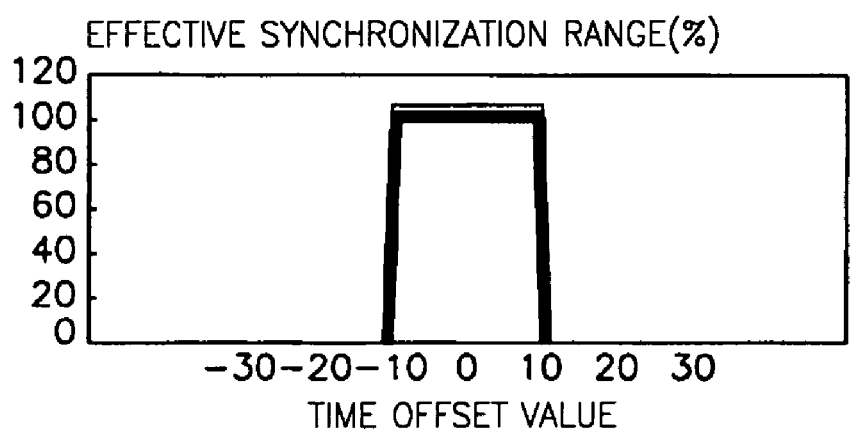
Figure 10D:
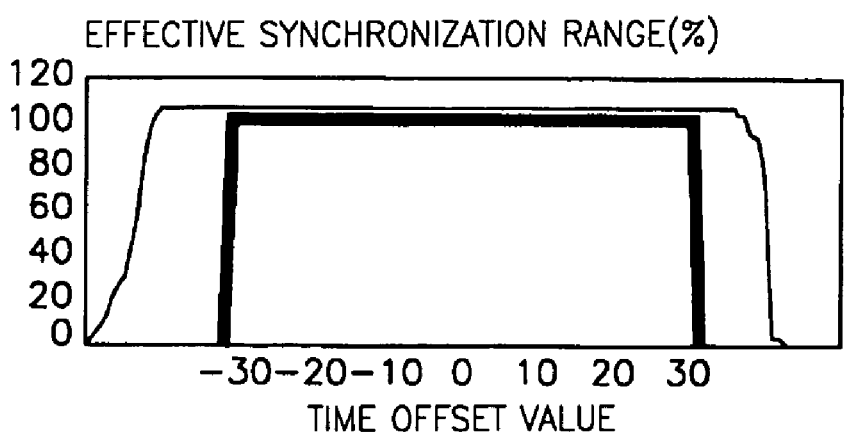

In contrast, referring to FIGS. 9A and 9B, in the conventional coarse frequency offset value detection method, the coarse frequency offset value is accurately detected in the case of no symbol time offset as shown in FIG. 9A. However, in the case of a symbol time offset of 10.0, as shown in FIG. 9B, no peak appears at the value of −62 on the horizontal axis corresponding to the given frequency offset value, showing that the coarse frequency offset value was not accurately detected.

FIGS. 10A-10D are graphs illustrating percentage probability of accurately detecting a course frequency offset value versus frame synchronization error value. The purpose of these graphs is to explain accuracy in error detection using the coarse frequency synchronization method of the present invention. Here, both theoretical data and data obtained by simulation are plotted. The simulation conditions are that the channel is a Gaussian channel with an SNR ratio of 5 dB and a sample time offset interval is in the range of −50-+50. The frequency offset is a value in the range of −510 to +510.

FIGS. 10A-10D show for comparison theoretical intervals and intervals obtained by simulations where a frequency offset value can be accurately detected according to the coarse frequency synchronization method of the present invention. The theoretical intervals are represented by a thick solid line and the intervals obtained by simulation are represented by a thin solid line. In the simulations, the number of subcarriers is 1024 and 2048, respectively, and the length of a guard interval is 128 samples. The simulations were performed to calculate the probability of accurately detecting a frequency offset value by applying a frequency offset to a particular time offset value 100 times for each repetition.

Referring to FIGS. 10A-10D, where the width $BW_s=1/K\times BW$ of each of K sub-bands into which the summation interval is divided is used as a summation interval of a correlation function, the present invention theoretically ensures accurate coarse frequency offset value detection if a time offset represented by a multiple of subcarrier spacings is within the range of $\pm K/2$. FIGS. 10A-10D show that the sub-band widths $BW_s$ are $BW_s=\frac{1}{8}\times BW$, $BW_s=\frac{1}{16}\times BW$, $BW_s=\frac{1}{32}\times BW$, and $BW_s=\frac{1}{64}\times BW$, respectively. Thus, the results of the simulations performed to evaluate the performance of the present invention show that calculating a correlation value by dividing the summation interval into sub-bands according to the present invention can accurately detect a coarse frequency offset value with respect to a time offset value that can be tolerated in frame synchronization, in contrast to the case of not dividing the summation interval.

According to the method of the present invention, the amount of computation is proportional to $N^2$ based on the amount of computation required for complex multiplication in an OFDM system using N subcarriers. In contrast, the conventional method using channel response requires the amount of computation to be proportional to $$N \times \left(N + \frac{N}{2}\log_2 N\right).$$

Thus, the method of the present invention can reduce the additional amount of computation $$\frac{N^2}{2}\log_2 N$$

within the tolerance given by a coarse frame synchronization algorithm while maintaining stable operation. The exact amount by which computation is reduced varies depending on the number of subcarriers. Specifically, the amount by which computation is reduced is the same as the amount of computation required to perform N IFFT operations where N is the number of subcarriers. For example, if the number of subcarriers is 1024, the present invention performs only ⅕ of the amount of computation conventionally performed, and if the number of subcarriers is 2048, the present invention performs only 1/11 of the amount of computation conventionally performed.

While this invention has been particularly shown and described with reference to a preferred embodiment thereof, it will be understood by those skilled in the art that various changes in form and details may be made therein without departing from the spirit and scope of the invention as defined by the appended claims. Thus, the scope of the present invention is limited not by the foregoing but by the following claims, and all differences within the range of equivalents thereof should be interpreted as being within the scope of the present invention.

As described above, the coarse frequency synchronization method and apparatus according to the present invention can prevent degradation in performance when a symbol timing error is greater than or equal to $\pm 1(\pm \frac{1}{2})$ by dividing the summation interval for calculating a correlation value between the received symbol and reference symbol into a predetermined number of sub-intervals determined according to a local coherence bandwidth.

In particular, this invention can accurately achieve coarse frequency synchronization even when a symbol timing error is greater than ±5 samples under poor channel conditions, by predistorting the reference symbol used in calculating a correlation value with the received symbol.

What is claimed is:

1. A coarse frequency synchronization apparatus in a frequency synchronizer of an orthogonal frequency division multiplexing (OFDM) receiver, the apparatus comprising:
   a buffer operable to receive a demodulated symbol and output a shifted symbol generated by cyclically shifting the demodulated symbol by a predetermined shift amount;
   a controller operable to determine a length of summation interval according to a phase coherence bandwidth and a number of sub-bands into which the summation interval is divided, and generate and adjust a symbol time offset according to the number of sub-bands;
   a reference symbol predistortion portion operable to generate a reference symbol whose phase is distorted by the symbol time offset;
   a counter operable to determine the shift amount;
   a partial correlation portion operable to receive the shifted symbol and the reference symbol and calculate a partial correlation value for each of the sub-bands; and
   a maximum value detector operable to calculate the shift amount where the sum of the partial correlation values is a maximum and output the shift amount as an estimated coarse frequency offset value.

2. The apparatus of claim 1, wherein the partial correlation portion is operable to calculate the partial correlation value for each sub-band using the equation $$\sum_{m=0}^{K-1} \left| \sum_{k=m(N/K)}^{(m+1)(N/K)-1} X(((k+d))_N) Z^*(k) \right|$$

where X(k+d) represents the shifted demodulated symbol, Z(k) represents the reference symbol, N is a number of subcarriers, K is the number of sub-bands and d is the predetermined shift amount and is a value between $$-\frac{2}{N} \text{ and } \frac{2}{N}.$$

3. The apparatus of claim 1, wherein the reference symbol predistortion portion comprises:
   a reference symbol generator operable to generate a phase reference symbol; and
   a phase rotation portion operable to rotate the phase of the phase reference symbol according to the symbol time offset and output a phase-distorted reference symbol.

4. The apparatus of claim 3, wherein the phase rotation portion is operable to generate a complex number corresponding to each of a plurality of subcarriers, by which a phase is rotated, multiply the generated complex number by the phase reference symbol, and generate the phase-distorted reference symbol.

5. The apparatus of claim 1, wherein the number of sub-bands is set to be less than $2 \times T_{off}$ where $T_{off}$ is a maximum time offset for which frame synchronization can be achieved.

6. A coarse frequency synchronization method for use in an orthogonal frequency division multiplexing (OFDM) receiver for performing OFDM demodulation and frequency synchronization, the method comprising:
   (a) receiving a demodulated symbol and outputting a shifted symbol generated by cyclically shifting the demodulated symbol by a predetermined shift amount;
   (b) determining the length of a summation interval according to a phase coherence bandwidth and a number of sub-bands into which the summation interval is divided, and generating a predetermined symbol time offset according to the number of sub-bands;
   (c) generating a reference symbol whose phase is distorted by the symbol time offset;
   (d) counting the shift amount;
   (e) calculating a partial correlation value between the shifted symbol and the reference symbol for each of the sub-bands; and
   (f) determining the shift amount d where the partial correlation value is a maximum and outputting the shift amount d as an estimated coarse frequency offset value.

7. The method of claim 6, where in step (e), the partial correlation value is calculated for each sub-band using the equation $$\sum_{m=0}^{K-1} \left| \sum_{k=m(N/K)}^{(m+1)(N/K)-1} X(((k+d))_N) Z^*(k) \right|$$

where X(k+d) represents the shifted demodulated symbol, Z(k) represents the reference symbol, N is a number of subcarriers, K is the number of sub-hands and the predetermined shift amount d is a value between $$-\frac{2}{N} \text{ and } \frac{2}{N}.$$

8. The method of claim 6, wherein step (c) comprises the steps of:
   (c1) generating a phase reference symbol; and (c2) rotating the phase of the phase reference symbol according to the symbol time offset and outputting a phase-distorted reference symbol.

9. The method of claim 8, wherein in step (c2), a complex number corresponding to each of a plurality of subcarriers, by which a phase is rotated, is generated, and the generated complex number is multiplied by the phase reference symbol to generate the phase-distorted reference symbol.

10. The method of claim 6, wherein the number of sub-bands is set to be less than $2 \times T_{off}$ where $T_{off}$ is a maximum time offset for which frame synchronization can be achieved.

11. An orthogonal frequency division multiplexing (OFDM) receiver including a coarse frequency synchronization apparatus, the apparatus comprising:
a buffer that receives a demodulated symbol and outputs a shifted symbol generated by cyclically shifting the demodulated symbol by a predetermined shift amount;
a controller that determines the length of a summation interval according to a phase coherence bandwidth and a number of sub-bands into which the summation interval is divided, and generates and adjusts a symbol time offset according to the number of sub-bands;
a reference symbol predistortion portion that generates a reference symbol whose phase is distorted by the symbol time offset;
a counter that counts the shift amount;
a partial correlation portion that receives the shifted symbol and the reference symbol and calculates a partial correlation value for each of the sub-bands; and
a maximum value detector that calculates the shift amount d where the partial correlation value is a maximum and outputs the shift amount d as an estimated coarse frequency offset value.

12. The receiver of claim 11, wherein the partial correlation portion calculates the partial correlation value for each sub-band using the equation $$\sum_{m=0}^{K-1} \left| \sum_{k=m(N/K)}^{(m+1)(N/K)-1} X(((k+d))_N) Z^*(k) \right|$$

where $X(k+d)$ represents the shifted demodulated symbol, $Z(k)$ represents the reference symbol, N is a number of subcarriers, K is the number of sub-bands and the predetermined shift amount d is a value between $$-\frac{2}{N} \text{ and } \frac{2}{N}.$$

13. The receiver of claim 11, wherein the reference symbol predistortion portion comprises:
a reference symbol generator that generates a phase reference symbol; and
a phase rotation portion that rotates the phase of the phase reference symbol according to the symbol time offset and outputs a phase-distorted reference symbol.

14. The receiver of claim 13, wherein the phase rotation portion generates a complex number corresponding to each of a plurality of subcarriers, by which a phase is rotated, multiplies the generated complex number by the phase reference symbol, and generates the phase-distorted reference symbol.

15. The receiver of claim 11, wherein the number of sub-bands is set to be less than $2 \times T_{off}$ where $T_{off}$ is a maximum time offset for which frame synchronization can be achieved.

* * * * *